(12) United States Patent
Ghumare et al.

(10) Patent No.: US 10,093,846 B2
(45) Date of Patent: Oct. 9, 2018

(54) AMIDO-AMINE BASED CATIONIC GEMINI SURFACTANTS FOR CLAY INHIBITION

(71) Applicant: HALLIBURTON ENERGY SERVICES, INC., Houston, TX (US)

(72) Inventors: Anant Kanhoba Ghumare, Nashik (IN); Monalisa Mallick, Kolkata (IN); Mallikarjuna Shroff Rama, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 67 days.

(21) Appl. No.: 15/307,104

(22) PCT Filed: Jun. 9, 2014

(86) PCT No.: PCT/US2014/041545
§ 371 (c)(1),
(2) Date: Oct. 27, 2016

(87) PCT Pub. No.: WO2015/191027
PCT Pub. Date: Dec. 17, 2015

(65) Prior Publication Data
US 2017/0081582 A1    Mar. 23, 2017

(51) Int. Cl.
| | | |
|---|---|---|
| *E21B 21/00* | (2006.01) | |
| *C09K 8/575* | (2006.01) | |
| *C09K 8/035* | (2006.01) | |
| *C09K 8/68* | (2006.01) | |
| *C09K 8/74* | (2006.01) | |
| *E21B 43/26* | (2006.01) | |

(52) U.S. Cl.
CPC .............. *C09K 8/575* (2013.01); *C09K 8/035* (2013.01); *C09K 8/68* (2013.01); *C09K 8/74* (2013.01); *E21B 21/00* (2013.01); *E21B 43/26* (2013.01); *C09K 2208/12* (2013.01)

(58) Field of Classification Search
CPC combination set(s) only.
See application file for complete search history.

(56) References Cited

U.S. PATENT DOCUMENTS

| | | | |
|---|---|---|---|
| 5,152,906 A | 10/1992 | Aften et al. | |
| 7,268,100 B2 | 9/2007 | Kippie et al. | |
| 8,222,455 B2 * | 7/2012 | Knox | A61K 8/02 |
| | | | 166/280.2 |
| 2004/0235677 A1 | 11/2004 | Nguyen et al. | |
| 2010/0210484 A1 | 8/2010 | Smith et al. | |
| 2012/0285689 A1 | 11/2012 | Weaver et al. | |

FOREIGN PATENT DOCUMENTS

| | | | | |
|---|---|---|---|---|
| CN | 103820093 | * | 5/2014 | ............. C09K 8/575 |
| IN | 269441 | | 10/2015 | |

OTHER PUBLICATIONS

Google translation of CN 103820093, obtained Apr. 13, 2018 (Year: 2018).*
International Search Report and Written Opinion for International Application No. PCT/US2014/041545 dated Jun. 9, 2014. (13 pages).
Ghumare et al., "Synthesis and antibacterial activity of novel amido-amine-based cationic gemini surfactants." Journal of Surfactants and Detergents, Jan. 1, 2013; pp. 85-93, vol. 16(1).
Lu et al., "Study of Property of Cationic Surfactants for Preventing Clay From Swelling,", SPE17826, International Meeting on Petroleum Engineering, 1998, pp. 1-26, Society of Petroleum Engineers.

* cited by examiner

*Primary Examiner* — Angela M DiTrani
(74) *Attorney, Agent, or Firm* — Haynes and Boone, LLP

(57) ABSTRACT

Methods for stabilizing a formation containing water sensitive materials include forming a composition including at least one amido-amine based cationic gemini surfactant and treating the water sensitive materials with an effective amount of the composition.

18 Claims, No Drawings

AMIDO-AMINE BASED CATIONIC GEMINI SURFACTANTS FOR CLAY INHIBITION

BACKGROUND

The present invention relates generally to methods for treating a subterranean formation in order to stabilize swelling clays and migrating fines.

The recovery of fluids such as oil and gas from subterranean formations has been troublesome in formations that contain water sensitive minerals, e.g., water-swellable clays such as clays in the smectite group and fines capable of migrating when disturbed such as silica, iron minerals and alkaline earth metal carbonates. Clay minerals ubiquitous in sedimentary rocks are hydrous aluminum phyllosilicates characterized by a stack of two-dimensional sheets composed of the $SiO_4$ tetrahedron and/or the $AlO_4$ octahedron. They can cause major problems during hydrocarbon exploration as clay minerals have a tendency to swell/migrate in the presence of water. The water can come from injection fluids, drilling muds, stimulation fluids, and gels. The ion-exchangeable cations present in-between the aluminosilicate sheets attract water in the interlayer molecular spaces and cause swelling. For example, the smectite group of clays such as montmorillonite absorbs water and expands in volume. During oil exploration, introduction of water causes these clays to swell, ultimately degrading the porosity and reducing the formation permeability. The clay mineral kaolinite, on the other hand, generates fines in the presence of water and tends to migrate. These fines migrate through the formation, blocking the pore spaces and reducing the permeability of the formation.

This loss in permeability and plugging or impairing the flow of formation fluids toward the well bore results in either a loss of the formation fluids or a decrease in the rate of recovery from the well. Sometimes the migrating fines are produced with the formation fluids and present abrasion and other problems with the above-ground equipment.

In an effort to overcome these problems, various methods have been developed for treating subterranean formations to stabilize swelling clays and migratable fines. For example, it has been a common practice to add salts to aqueous drilling fluids. The salts adsorb to clay surfaces in a cation exchange process and can effectively reduce the swelling and/or migration of the clays. Various polymers and consolidating resins have also been used. However, in many areas, environmental regulations restrict the use of high salt concentrations and various resin and polymer compositions. Thus, there is a continuing need for improved and more environmentally benign methods and compositions for treating subterranean formations to prevent or reduce the swelling of clays and the migration of fines during drilling, treating and fluid recovery operations.

DETAILED DESCRIPTION

According to several exemplary embodiments of the present invention, a method is provided for stabilizing water-sensitive materials in subterranean formations using amido-amine based cationic gemini surfactants. Water sensitive minerals that can be stabilized by the methods according to several exemplary embodiments of the present invention include fines and swellable clays. Fines stabilized by such exemplary methods of the present invention include, but are not limited to, silica, iron minerals, alkaline earth metal carbonates, feldspars, biotite, illite, chlorite and mixtures thereof. Without stabilization, these fines often cause a reduction in formation permeability by migrating to the well bore and blocking pore throats and passageways to the well bore. Contacting the fines with the amido-amine based cationic gemini surfactants described herein reduces the tendency of the fines to migrate and therefore reduces their tendency to decrease formation permeability.

Swellable clays that can be stabilized by such exemplary methods of the present invention include, but are not limited to, the smectite group such as montmorillonite, beidellite, nontronite, saponite, hectorite and sauconite; the kaolin group such as kaolinite, nacrite, dickite, endellite and halloysite; the illite group such as hydrobiotite, glauconite and illite; the chlorite group such as chlorite, greenalite and chamosite; and other clay minerals not belonging to the above groups such as vermiculite, palygorskite, sepiolite; and mixed-layer (both regular and irregular) varieties of the above minerals. For example, smectite clay minerals which have a very high cation exchange capacity, tend to swell when contacted with fresh water, thereby reducing formation permeability. The swelling can also cause smectite to disperse into platelets which can then migrate and block passageways to the well bore. Contacting swellable clays with the amido-amine based cationic gemini surfactants described herein reduces the tendency of these clays to swell.

Gemini surfactants are a class of surfactants that include two lyophilic and two lyophobic moieties connected at the level of the head groups or very close to the head groups by a spacer group. The amido-amine based cationic gemini surfactants used in several exemplary methods of the present invention have the Formula I:

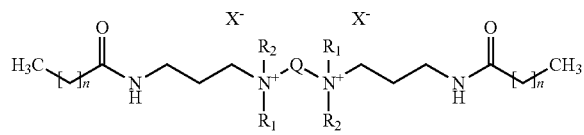

Formula I wherein n is 2-36 or 6-16; Q is a spacer group; $R_1$ and $R_2$ are alkyl groups having 1-5 carbon atoms; and X is F, Cl, Br, or I. In several exemplary embodiments, Q is an alkyl group having from 1-10 carbon atoms, 1-6 carbon atoms, or 3-6 carbon atoms. In several exemplary embodiments, Q is an aromatic group or an aliphatic group. In several exemplary embodiments, Q includes a hetero atom such as silicon (Si), sulfur (S), oxygen (O), and/or nitrogen (N). In several exemplary embodiments, n is 6 and Q is an alkyl group with 2 carbon atoms. In several exemplary embodiments, n is 20 and Q is an alkyl group with 8 carbon atoms.

Without being bound by theory, it is believed that the amido-amine based cationic gemini surfactants adsorb to the surface of the clays and fines and prevent their swelling and migration. This adsorption relates to the ability of the amido-amine based cationic gemini surfactants to irreversibly bind to the clay surface and make the surface hydrophobic. These surfactants inhibit clay swelling and disintegration or exfoliation of the clay by exchanging the cations in the clay layers with the cations in the surfactants. This cation exchange makes the surface hydrophobic and results in non-swelling and integration of the clay layers. When the amido-amide based cationic gemini surfactants are adsorbed on the clay surface, the long chain alkyl group in its molecules form a hydrophobic film on the clay surface to prevent further penetration of the water to decrease the clay hydratability. The cations in the surfactants can also neutralize the negative charges on the clay surface to reduce repulsion between the clay layers.

The amido-amine based cationic gemini surfactants can exchange cations irreversibly because of their greater affinity to the clay layers compared to traditionally used simple inorganic cations. The capacity to bind the clay layers, keep them intact, and exchange cations irreversibly is relatively higher when the molecule has more than one cationic group. The ability to bind the clay layers is further enhanced when there are amido groups present in the molecule. Accordingly, the amido-amine based cationic gemini surfactants described herein act as a better clay control agent than existing clay inhibitors. In addition, these cationic gemini surfactants were found to be less toxic and less persistent in the environment than conventional quaternary ammonium surfactants.

The process for preparation of the amido-amine based cationic gemini surfactants includes the steps of:

1) reacting a compound of Formula II with a compound of Formula III in the presence of an organic solvent to give the amido-amine intermediate of Formula IV; and

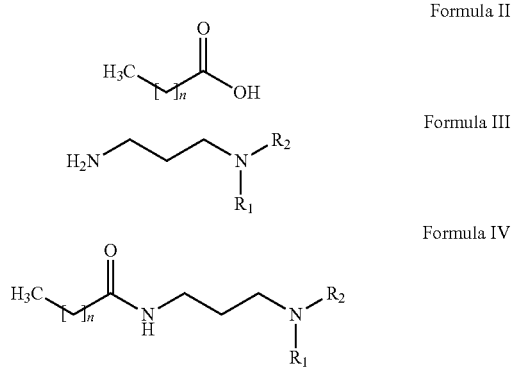

2) reacting the amido-amine intermediate of Formula IV with a dihalo alkane of Formula V in the presence of a solvent to give the amido-amine based cationic gemini surfactant of Formula I.

Formula V $$X \diagdown Q \diagdown X$$

The organic solvent in step 1 is selected from any suitable aromatic hydrocarbon, such as benzene, toluene, and xylene. In certain embodiments, toluene is used for about 16-18 hours. Step 2 of the process is carried out in an organic solvent such as acetone, ethanol, acetonitrile, isopropanol, or chloroform for about 60-80 hours. According to several exemplary embodiments, the process is carried out in an inert atmosphere.

Below is a synthesis route of a series of amido-amine based cationic gemini surfactants.

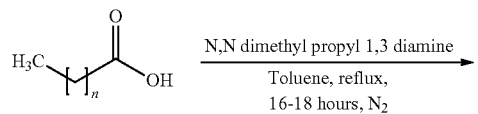

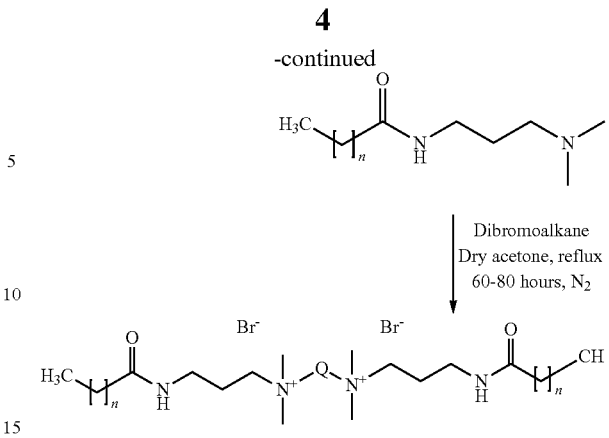

A method for stabilizing a formation containing water sensitive minerals includes treating the formation with a treatment fluid that includes an effective amount of one or more of the amido-amine based cationic gemini surfactants described herein. The treatment fluid is prepared by combining and mixing a known volume or weight of treatment fluid and one or more amido-amine based cationic gemini surfactants using mixing procedures known to those of ordinary skill in the art. In some embodiments, the treatment fluid includes water and one or more amido-amine based cationic gemini surfactants, wherein the one or more amido-amine based cationic gemini surfactants are present in the treatment fluid in an amount of from about 0.0001 to about 99.9 weight percent and water is present in an amount of from about 0.1 to about 99.99 weight percent. In several exemplary embodiments, the one or more amido-amine based cationic gemini surfactants are present in the treatment fluid in an amount of from about 0.01 to about 12.0 weight percent.

The water utilized in the treatment fluid can be fresh water, salt water, or a mixture thereof, depending on the density desired and the formation sensitivity. The term "salt water" is used herein to mean unsaturated salt water or saturated salt water including brines and seawater.

Additional salt may be added to the treatment fluid. Suitable salts include, but are not limited to, sodium, ammonium, potassium, calcium and zinc chlorides, bromides, hydroxides, and acetates, as well as other salts commonly used and known to those of ordinary skill in the art.

The treatment fluid can also include aqueous acid solutions. Suitable aqueous acids include, but are not limited to, hydrochloric acid, citric acid, acetic acid, formic acid, hydrofluoric acid, and mixtures thereof. The treatment fluid can include alcohol-water mixtures such as methanol and water as well as gelled fluids containing various polysaccharides and synthetic polymers. As will be understood by those of ordinary skill in the art, a variety of conventional additives can be added to the treatment fluid that do not adversely react with the amido-amine based cationic gemini surfactants.

The treatment fluid can be made to contact the water sensitive minerals by any suitable method that provides effective contact between the treatment fluid and the minerals. The treatment fluid utilized can be used in conjunction with drilling, well injecting, gravel packing, fracturing or other operations performed on the subterranean formation. For example, the treatment fluid containing the surfactants can be used in conjunction with drilling or completion operations to alleviate the damage otherwise caused by drilling or completion fluids.

When treating the formation adjacent to the well bore, the treatment fluid can be spotted and allowed to penetrate the formation being treated. During production, recovery rates can be stimulated by injecting an effective amount of treatment fluid to penetrate the formation, and then resuming production. In a water flood oil recovery operation, the treatment fluid can be injected in front of the water flood in order to stabilize the clays and fines.

Acidizing is a common technique used to improve production. Acid is pumped into the formation to enlarge passageways and improve permeability. In some formations, acidizing can loosen fines which then migrate and cause plugging. Addition of the amido-amine based cationic gemini surfactants to the acid treatment fluid helps to prevent the fines from migrating thereby improving the efficiency of the acidizing step.

Hydraulic fracturing is another common technique to improve the rate of production from a well. The well is pressurized until the formation fractures. The fracturing fluid enters the fractures and deposits proppant material in the fractures. The proppant material holds the fractures open after the fracturing fluid flows back to the well. Fracturing fluid that bleeds into the formation can react with clays and fines to reduce permeability. Use of the amido-amine based cationic gemini surfactants in conjunction with fracturing minimizes the swelling and migration of the clays and fines caused by contact with the fracturing fluid.

Example 1

Capillary Suction Time (CST) Test

The CST test is a rapid semi-quantitative method for comparison of the inhibiting property of fluids for a specific formation. The purpose of this test is to compare the effects of aqueous fluids on the tendency for clay swelling and/or dispersion. The CST equipment measures the time (in seconds) required for a sample fluid to pass between two electrodes and is used to determine the propensity of a clay to swell once it is introduced to fresh water. The time indicates maximum swelling/dispersion inhibition. Accordingly, the lesser the time, the greater the ability of the fluid to inhibit swelling and/or dispersion.

CST tests were performed for several treatment fluids containing salts and/or surfactants. The results of the tests are provided below in Table I.

TABLE I

| Treatment Fluid | Run 1 | Run 2 | Average | Average Blank | CST Ratio A | CST Ratio B |
|---|---|---|---|---|---|---|
| Deionized Water | 61.7 | 62.5 | 62.1 | 11.2 | 1.00 | 4.54 |
| 3% KCl | 19.9 | 17 | 18.5 | 11.2 | 0.30 | 0.65 |
| 5% KCl | 16.8 | 16.7 | 16.8 | 11.2 | 0.27 | 0.50 |
| 0.05% ClaWeb$^{SM}$ | 17.5 | 17 | 17.3 | 11.2 | 0.28 | 0.54 |
| 0.1% ClaWeb$^{SM}$ | 17.3 | 16.1 | 16.7 | 11.2 | 0.27 | 0.49 |
| 1% Losurf-400 ™ | 25.6 | 24.8 | 25.2 | 11.2 | 0.41 | 1.25 |
| 0.1% Losurf-400 ™ | 16.9 | 16.6 | 16.8 | 11.2 | 0.27 | 0.50 |
| 0.05% Losurf-400 ™ | 15.8 | 14.2 | 15.0 | 11.2 | 0.24 | 0.34 |
| 0.01% Losurf-400 ™ | 15.4 | 15.8 | 15.6 | 11.2 | 0.25 | 0.39 |
| 3% KCl + 0.01% Losurf-400 ™ | 20.2 | 19.7 | 20.0 | 11.2 | 0.32 | 0.79 |

Average Blank = Average CST value of deionized water without any sample;
CST Ratio A = Average CST/Average CST of deionized water;
CST Ratio B = (Average CST − Average Blank)/Average Blank The LoSurf-400™ surfactant is a mono-quaternary ammonium surfactant. The amido-amine based cationic gemini surfactants described herein are bi-quaternary ammonium surfactants, and are expected to have superior clay inhibiting properties because of the additional quaternary ammonium group. Also, the amido groups in the gemini surfactants improve the binding capacity of surfactants and make the binding more permanent.

It is expected that other mono-quaternary ammonium surfactants will behave similarly to the LoSurf-400™ surfactant at similar concentrations. For example, to achieve the effect provided by the LoSurf-400™ surfactant at 1%, the other surfactants would also have to be present at an amount of 1%. Because of the superior clay inhibiting properties of the amido-amine based cationic gemini surfactants, a smaller quantity of the amido-amine based cationic gemini surfactants would be needed to achieve a similar effect. For example, instead of being present in an amount of about 1%, the gemini surfactants would be present at a concentration of about 0.1%. Thus, less surfactant would be needed and released into the environment.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method for stabilizing a formation containing water sensitive materials comprising:
   forming a composition comprising at least one amido-amine based cationic gemini surfactant having Formula I:

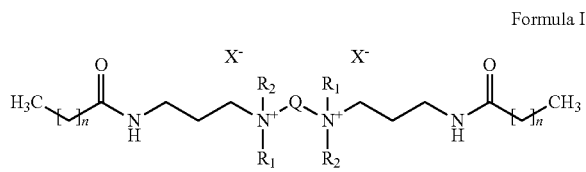

Formula I wherein n is 2-36; Q is an alkyl group having 1-10 carbon atoms, an aromatic group, or an aliphatic group, and includes one or more of Si, S, and N; $R_1$ and $R_2$ are each alkyl groups having 1-5 carbon atoms; and X is F, Cl, Br, or I; and treating the water sensitive materials with an amount of the composition effective to stabilize the water sensitive materials.

2. The method of claim 1, wherein n is 6 and Q is an alkyl group having 2 carbon atoms and includes one or more of Si, S, and N, or n is 20 and Q is an alkyl group having 8 carbon atoms and includes one or more of Si, S, and N.

3. The method of claim 1, wherein n is 6-16.

4. The method of claim 1, wherein Q is an alkyl group having 1-6 carbon atoms or 3-6 carbon atoms, and includes one or more of Si, S, and N.

5. The method of claim 1, wherein $R_1$ and $R_2$ each comprise a methyl group.

6. The method of claim 1, wherein the water sensitive minerals comprise fines capable of migrating and decreasing formation permeability, swellable clays, or both.

7. The method of claim 6, wherein the fines are selected from the group consisting of silica, iron minerals, alkaline earth metal carbonates, feldspars, biotite, illite, chlorite and mixtures thereof; and the swellable clays are selected from the group consisting of smectite, kaolin, illite, chlorite, vermiculite, palygorskite, sepiolite and mixtures thereof.

8. The method of claim 1, wherein the composition further comprises water.

9. The method of claim 8, wherein the composition comprises from about 0.01 to about 12.0 weight percent of the at least one amido-amine based cationic gemini surfactant.

10. The method of claim 8, wherein the water comprises fresh water, salt water, or mixtures thereof.

11. The method of claim 1, wherein the composition further comprises an aqueous acid solution, alcohol-water mixture, gel, or mixtures thereof.

12. The method of claim 1, wherein the water sensitive materials are treated with the effective amount of the composition during one or more of drilling of a well bore through the formation, during production from a producing formation or injection into a formation, and during fracturing or acidizing the formation.

13. A method for stabilizing a formation containing water sensitive materials comprising:
forming a composition comprising at least one amido-amine based cationic gemini surfactant having Formula I:

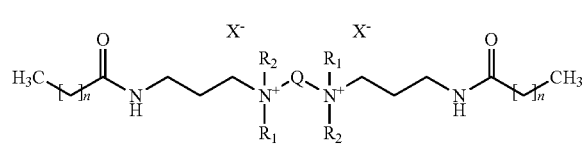

Formula I wherein n is 2-36; Q is an alkyl group having 1-10 carbon atoms, an aromatic group, or an aliphatic group, and includes one or more of Si, S, and N; $R_1$ and $R_2$ are each methyl groups; and X is Br; and
treating the water sensitive materials with an amount of the composition effective to stabilize the water sensitive materials.

14. The method of claim 13, wherein n is 6 and Q is an alkyl group having 2 carbon atoms, and includes one or more of Si, S, and N, or n is 20 and Q is an alkyl group having 8 carbon atoms, and includes one or more of Si, S, and N.

15. The method of claim 13, wherein the composition comprises from about 0.01 to about 12.0 weight percent of the at least one amido-amine based cationic gemini surfactant.

16. The method of claim 13, wherein the composition further comprises an aqueous acid solution, alcohol-water mixture, gel, or mixtures thereof.

17. A method for stabilizing a formation containing water sensitive materials comprising:
forming an aqueous composition comprising from about 0.01 to about 12.0 weight percent of at least one amido-amine based cationic gemini surfactant having Formula I:

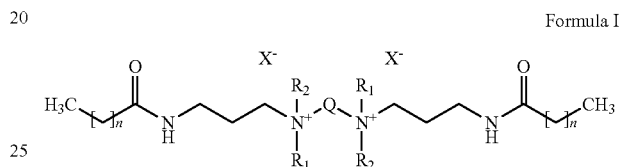

Formula I wherein n is 2-36; Q is an alkyl group having 1-10 carbon atoms, an aromatic group, or an aliphatic group, and includes one or more of Si, S, and N; $R_1$ and $R_2$ are each alkyl groups having 1-5 carbon atoms; and X is F, Cl, Br, or I; and
treating the water sensitive materials with an amount of the composition effective to stabilize the water sensitive materials.

18. The method of claim 17, wherein n is 6 and Q is an alkyl group having 2 carbon atoms and includes one or more of Si, S, and N, or n is 20 and Q is an alkyl group having 8 carbon atoms and includes one or more of Si, S, and N.

* * * * *